Sept. 6, 1960     I. E. NUTTER     2,951,691
VALVE MECHANISM FOR FLUID AND LIQUID CONTACT APPARATUS
Filed June 26, 1956     4 Sheets-Sheet 1

INVENTOR
IRVIN E. NUTTER

BY
ATTORNEYS

Sept. 6, 1960     I. E. NUTTER     2,951,691
VALVE MECHANISM FOR FLUID AND LIQUID CONTACT APPARATUS
Filed June 26, 1956     4 Sheets-Sheet 2

INVENTOR
IRVIN E. NUTTER

BY
ATTORNEYS

Sept. 6, 1960 I. E. NUTTER 2,951,691
VALVE MECHANISM FOR FLUID AND LIQUID CONTACT APPARATUS
Filed June 26, 1956 4 Sheets-Sheet 3

INVENTOR
IRVIN E. NUTTER

BY
ATTORNEYS

Sept. 6, 1960     I. E. NUTTER     2,951,691
VALVE MECHANISM FOR FLUID AND LIQUID CONTACT APPARATUS
Filed June 26, 1956     4 Sheets-Sheet 4

INVENTOR
IRVIN E. NUTTER

United States Patent Office 2,951,691
Patented Sept. 6, 1960

2,951,691

VALVE MECHANISM FOR FLUID AND LIQUID CONTACT APPARATUS

Irvin E. Nutter, Enterprise Bldg., Tulsa, Okla.

Filed June 26, 1956, Ser. No. 594,049

3 Claims. (Cl. 261—114)

The present invention relates to a gaseous and liquid contact apparatus and, more particularly, to an improved valve assembly associated with the bubble tray of a refining tower or the like, for the purpose of producing uniform distribution of the flow of gas or vapor by contact and thorough mixing of the gas or vapor with the liquid. The invention is also directed to improvements in the valve control means embodied in my patents, 2,718,900, dated September 27, 1955, and 2,718,901, dated September 27, 1955.

An important object is to provide a simple, efficient, compact, and economical control means composed of a minimum number of parts and which automatically regulates the upward flow of gas or vapor through bubble tray openings and the like, in accordance with differential ranges of pressure across each tray. The control means essentially includes one or more one-piece self-retaining floating pivoted valves or members which may be of elongated flat shape or any suitable curved configuration, so as to overlap and normally close a flow opening or slot in the tray deck. Each floating pivoted valve has depending means extending through a flow opening and provided with a stop flange or lug, which engages the underside of the tray, when the valve is raised a predetermined distance relative to the tray in order to limit the upward movement of the valve relative to the tray without requiring the use of separate stop members or straps, or the use of retaining bolts, nuts, or rivets for securing the stop members in a fixed position such as heretofore has been required.

A further object consists in forming each of the floating valves with a longitudinally disposed louver having a louver opening. The louver is shaped to extend downwardly into a flow opening in the tray so as to separate the gas or vapor passing upwardly therethrough. Thus, means are provided for laterally jetting the gas or vapor into the liquid at a relatively high velocity in order to cause the gas or vapor to break up into very fine bubbles upon mixing with the liquid.

A still further object is to provide each of the trays of a refining or bubble tray tower with slots or flow openings, each of which openings is punched from the tray along one side and its ends, so as to form with the opposite side of the slot an integral longitudinally disposed depending flange or leg. The flow openings are arranged in transverse rows with the openings in each row being offset relative to those in adjacent rows. The integral depending flanges or lips extending from one side of the flow openings provide reinforcing means for stiffening the tray deck, so as to make the same substantially self-supporting and also provide protection for the depending legs of the valve, and thus dispense with the use of supplemental or auxiliary trussing or reinforcing means usually applied to structures of this type, when the apparatus is applied to small diameter towers and to minimize supplemental or auxiliary trussing when applied to moderate or large diameter towers.

Other objects and advantages of the invention will become apparent from the following description, when taken in conjunction with the accompanying claims and drawings.

Referring to the drawings in which are shown several preferred embodiments of the invention:

Figure 5a is a sectional view similar to Figure 3 of a symmetrically shaped floating valve;

Figure 2:
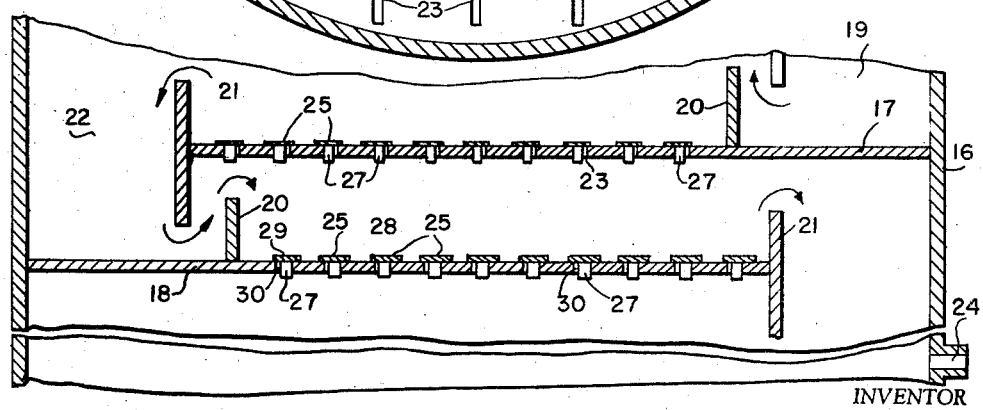
Figure 2 is a vertical sectional view taken substantially along the line 2—2 of Figure 1.
Figure 7:
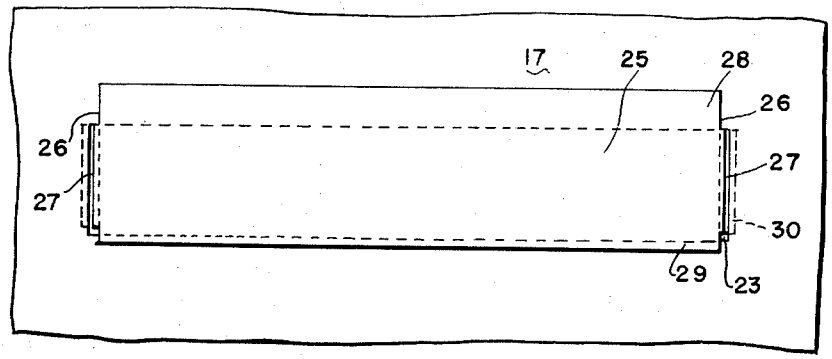
Figure 7 is a detailed plan view showing the floating pivoted valve in its raised position.

Referring to the drawings, the gaseous and liquid contact apparatus is shown in the form of a cylindrical refining or bubble tower 16 which may be provided with any suitable number of vertically spaced trays alternately arranged laterally, such as tray 17 with respect to tray 18 (Fig. 2), so as to provide a transverse passage of the liquid from one side of the tower 16 to the opposite side thereof. Each tray of the bubble tower 16 has a down spout 19 on one side thereof for receiving the descending liquid and directing the same over a seal-weir 20 (Fig. 2) onto and across the tray 17 and over an over-flow weir 21 into a down spout 22 on the opposite sides of the tower 16.

Each tray between the seal-weir 20 and the overflow weir 21 has one or more elongated flow openings or slots 23, preferably arranged in spaced transverse offset rows that allows the gas or vapor to flow from below each of the trays to points above the same during the operation of the tower, so as to provide intimate contact and mixing of the upwardly flowing gas or vapor with the descending liquid as the latter laterally traverses each of the trays. Gas or vapor under pressure may be introduced into the tower 16 through an inlet 24 (Fig. 2) positioned in one side thereof and below the bottom tray of tower 16. The gaseous material is emitted from the tower through a similar exit opening, not shown, positioned above the uppermost tray after traversing upward through each tray.

Figure 8:
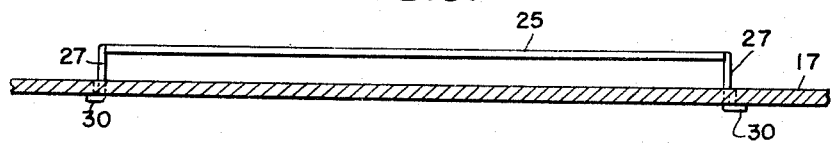
Figure 8 is a side elevational view of Figure 7.
Figure 3:
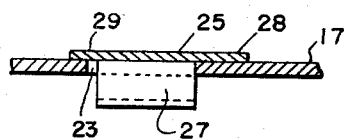
Figure 3 is an enlarged sectional view taken substantially along the line 3—3 of Figure 1.
Figure 4:
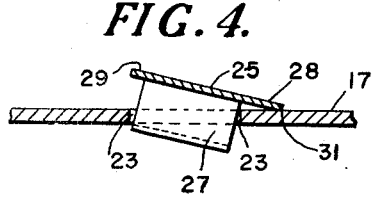
Figure 4 is a view similar to Figure 3, showing the valve moved or rocked on one edge so as to raise the opposite side away from the bubble tray.

Each of the elongated flow openings 23 is covered or closed by a flow regulating member which may be in the form of an elongated flat rigid floating pivoted valve 25 of slightly less length than the length of its associated flow openings 23 but of greater width than the flow opening so as to overlap the adjacent sides of the top of the tray and engage the same when the valve is in its closed positon. Each end 26 of valve 25 has a reduced depending arm or portion 27 (Fig. 8) that extends through the flow opening 23. Each of these arms preferably is offset relative to the adjacent side or end of the valve 25, so as to provide an overlap edge 28 of the valve of greater width than the opposite overlapped edge 29. Thus, it will be seen that when the parts are assembled, each of the floating pivoted valves 25 has its light edge 29 constituting the leading edge and arranged initially to be raised from its closed position, as shown in Figure 3, to its tilted or rocked position, as shown in Figure 4, upon variation in the differential gas pressure from below the tray to above the same. It will be noted that each of the heavy side edges 28 of the valve 25 is closer to the liquid exit side of the tray and the light side 29 nearest to the liquid inlet, thus providing means for controlling the direction of opening of each of the valves 25, so as to insure complete uniformity of operation of all the valve units associated in a multiple apparatus, or the like. The spaced depending arms 27 are of less width than the flow openings 23 and are of such length as to extend through the flow opening 23 and terminate in outwardly and laterally projecting stop flanges or lugs 30 (Fig. 8). Each of the stops 30 is spaced a predetermined distance from the top of the valve 25, so as to engage the underside of the tray 17 to limit the upward movement of the valve relative to the tray.

Since the length of each of the flow openings 23 is slightly greater than the length of its associated valve 25 and depending arms 27 are of less width than flow openings 23, the depending arms 27 are first introduced into the flow openings 23 and then each of the arms 27 is outwardly bent to form a stop flange or lug 30 which is of such length as to overlap the underside of tray 17 at the ends of each of the flow openings 23 and limit the upward movement of the rigid float valve 25. The loose engagement of the arms or legs 27 with the adjacent walls of each of the flow openings or slots 23 permits shifting of the valve 25 transversely relative to its associated tray 17 or 18, and also serves to limit the longitudinal and transverse movement of the valve 25 relative to the tray. Thus, each of the valves 25 has self-retaining means for controlling its movement relative to its associated flow opening. Each of valves 25 is always positioned on the tray so that its heavy edge is on the side of the associated flow opening or slot towards the liquid exit side of the tray. A basic feature of the unbalanced float valve 25 is the fact that once the light edge opens, by pivoting about the heavier edge, the valve shifts to the limit of the confines toward the heavy edge of the valve, thus causing the depending leg of the valve to be in contact with the side of the slot adjacent the heavy edge, whereas the depending arm or leg, adjacent to the light edge of the valve, is spaced away from the adjacent wall of the slot. When the valve obtains the tilted position (Fig. 4), the edges of the depending arms are in firm contact with the side of the slot and the higher toe of the flange underneath the tray is also in firm contact so that as the valve position proceeds from the half open position to the full open position, the frictional drag at these points of contact prevents unstability of the valve and causes it to open smoothly and steadily or remain in any set flow condition without fluttering or other movement. By reason of the side edge 28 of each of the valves 25 being nearer the exit side of the tray than the lighter side 29 thereof, means are provided for specific directional control of each of the flow openings 23 so as to insure complete uniformity of operation; in other words, all of the heavy edges of the valves 25 are positioned in the same direction towards the liquid exit so as to cause the opposite light edges to be initially raised to allow the flow of gas or vapor to be moved upwards through the flow openings 23 and oppose or mildly resist the flow of liquid across the top of the tray due to the initial flow of gas or vapor being moved upwards against the normal direction of the liquid flow across the tray from the inlet to the outlet side thereof.

Figure 5:
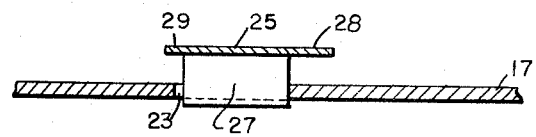
Figure 5 is a view similar to Figure 3, showing the pivoted valve in its completely raised position.

In the modification disclosed in Figure 5A, the valve 25 is of symmetrical shape and has the depending legs or arms 27 extending downwardly therefrom, which are narrower than the slot 23, so that the marginal edge 29' on one side of the legs 27 is of the same length as the marginal edges 29' on the opposite side thereof, in order to provide a symmetrical or balanced valve which initially is raised on one side while its opposite side rocks or pivots about the top of the tray 17. It will be seen that, with the depending arms 27 centrally positioned relative to the ends of the valve 25, when one of the edges of the valve is moved to overlap the top of the deck adjacent the slot over a greater area than the opposite edge, the legs 27 are shifted in either direction to their extremity, so that the valve may initially be rocked or raised relative to the flow opening.

Figure 6:
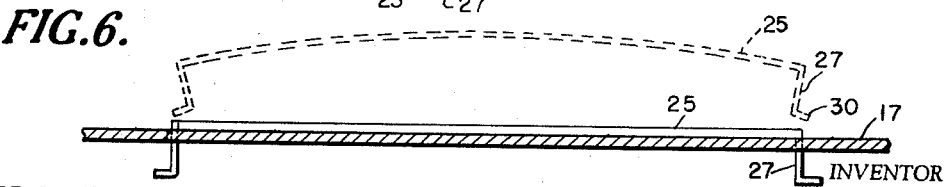
Figure 6 is a detailed transverse sectional view of a tray showing the floating pivotal valve in its closed position and formed of flexible material so as to be bent or bowed to the shape, as shown in dotted lines, in order to be readily removed or inserted in the flow opening of the tray.
Figure 5:
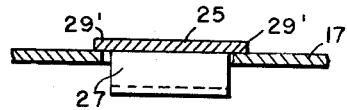

As shown in Figure 6, the valve 25, instead of being formed of rigid or stiff material, is preferably made of flexible material, with the stop flanges 30 at lower ends of legs 27 being formed before the valve is applied to the tray. The flexible valve 25 is capable of being longitudinally bent upon the application of manual pressure so as to assume the position, shown in dotted lines (Fig. 6), in order to initially insert the legs 27 of the valve into the flow opening so that, upon release of the manual pressure, the valve 25 and the legs 27 are expanded longitudinally so that the stop flanges 30 on the arms engage the underside of the tray 17 to limit the upward movement of the valve. The flexible valve 25 may readily be removed from its engagement with the tray upon the application of sufficient upward pressure to cause the valve 25 to be bent and the legs 27 to be moved inwardly so as to withdraw the flanges 30 away from the end walls of opening 23 so that the valve may be removed from the tray.

In operation, when sufficient gas or vapor pressure differential accumulates across a tray 17 or 18 to overcome the weight of the light side of valve 25 and the liquid head above the tray, each of the valves 25 is initially moved or tilted to cause the heavy edge 28 thereof to rock about the top of the tray on a fulcrum point 31 (Fig. 4), so as to allow a limited amount of gas or vapor below the tray to pass upwardly through each of the flow openings 23. Thus, the light or opposite edge 29 of the floating pivoted valve 25 is raised or opened, in accordance with the magnitude of the pressure differential of gas or vapor from below to above each of the trays. Upon application of sufficient gas pressure on the underside and differential pressure from underneath to above the tray, the valves are uniformly raised or tilted throughout the trays to their half open position (Fig. 4) at approximately 20% of the maximum allowable flow capacity and corresponding pressure differential across the tray. This pressure differential is relatively small yet of sufficient magnitude to accomplish complete distribution of the gas or vapor through all of the flow openings 23 associated with each tray. As the pressure differential increases when the valves 25 are in their tilted position (Fig. 4), the rates of gas or vapor through all of the flow openings correspondingly increase. At approximately 40% of the maxium allowable flow capacity and corresponding tray differential across each of the trays, the fulcrum 31 of each of the heavy edges 28 is moved away from the tray so as to raise the valve to its fully opened position (Fig. 5) without any further appreciable increase in pressure differential across the tray. The upward movement of the valve 25 relative to the tray is limited by the engagement of the stop flanges or lugs 30 with the underside of the tray adjacent the ends of slot 23. The depending arms or legs 27 are laterally narrower than the lateral width of slot 23, so as to permit free rocking movement of each of valves 25 on its pivot 31 without danger of the opposite edges of the arms 27 simultaneously abutting the adjacent walls of the flow openings 23 (Fig. 4). Furthermore, the edges of depending arms 27, adjacent the heavy edge 28 of valve 25, are brought into contact with the adjacent edge of slot 23, allowing freedom of movement of the opposite edges of arms 27 within slot 23 when the initial tilted position (Fig. 4) is assumed. Upon the flow of gas through slot 23 from under valve 25 (Fig. 4) the valve is shifted to limit position towards the heavy edge 28 so that the adjacent edges of arms 27 are brought into firm contact with the adjacent wall of slot 23 as gas issuing from the light edge 29 urges the valve towards its heavy edge 28. This function of the valve upon operation causes further movement of the valve to be dampened, thus preventing hunting or fluttering of valve 25 because of the firm contact of legs 27 with the wall of slot 23 adjacent heavy edge 28 of valve.

Figure 9:
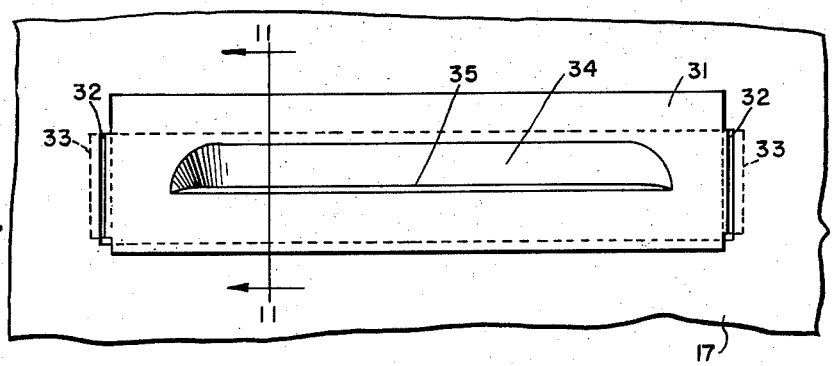
Figure 9 is a plan view of a modified form of floating pivoted valve showing the same provided with a louver opening and in its raised position.
Figure 10:
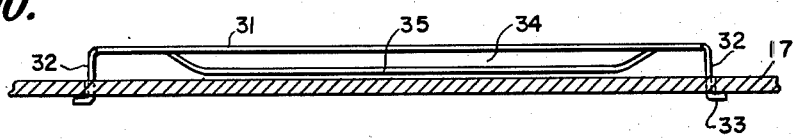
Figure 10 is a side elevational view of Figure 9.
Figure 11:
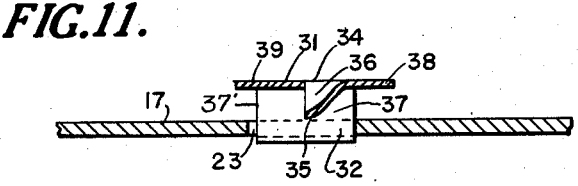
Figure 11 is a transverse view taken substantially along the line 11—11 of Figure 9.

In the modified form of the invention shown in Figures 9, 10, and 11, the floating pivoted valve 31 is substantially similar in construction and operation to the valve 25, previously described, and has the depending integral spaced arms 32 which extend through a flow opening 23 in each of the trays. The arms 32 are provided at their lower ends with the outwardly and laterally extending stop flanges or shoulders 33 that engage the underside of the tray 17 and are spaced a predetermined distance from the top of the valve so as to limit the upward movement of each of the valves 31 relative to its flow opening 23. The stop flanges 33 are formed after the arms 32 of the valve 31 are inserted through each of the flow openings 23. The elongated valve 31 lengthwise and substantially centrally thereof is punched or struck out as at 34 (Fig. 11) to form an inwardly extending louver or flange 35 that extends downwardly towards the flow opening 23, so as to provide a supplemental passage or louver opening 36 for conducting the gas or vapor upwardly and outwardly towards heavy edge 38 through each of the openings 23 and in a manner substantially similar to the louver construction disclosed in my patent, 2,718,901, previously referred to. Thus, means are provided for efficiently separating the stream of gas or vapor from the stream being emitted at the heavy edge 38 of valve 31 from under the tray. As shown, the valve has the heavy edge 38 and a light edge 39. The louver or flange 35 separates the flow of gas or vapor through opening 23 into the flow passages 36, 37 and 37'. The configuration of each of the louvers 35 is such that the gas or vapor leaving the valve through the branch passages 36 and 37 discharges upwardly and outwardly at about 45°. Otherwise, the parts are substantially similar in construction and operation to the forms previously described. The upward flow of the gas or vapor through each of the openings 23 is therefore separated by the downwardly extending louver or flange 35 to be deflected outwardly and laterally in opposite directions through passages 37 and 37' and upwardly above the top of the valve 31 through the passage 36, in order to insure intimate contact of the gas or vapor with the liquid passing over the top of each of the trays during the operation of the apparatus.

Figure 1:
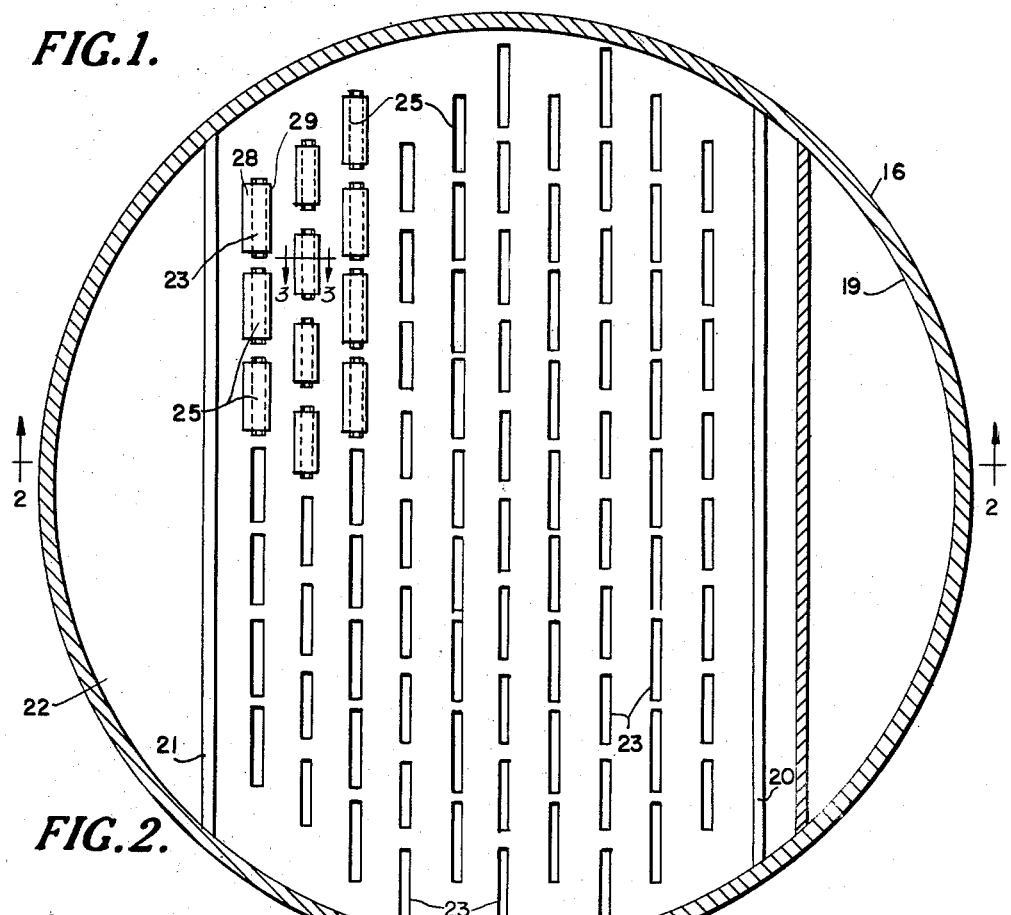
Figure 1 is a sectional plan view of a bubble tower or the like, provided with a gas and liquid contact apparatus constructed in accordance with the present invention.
Figure 12:
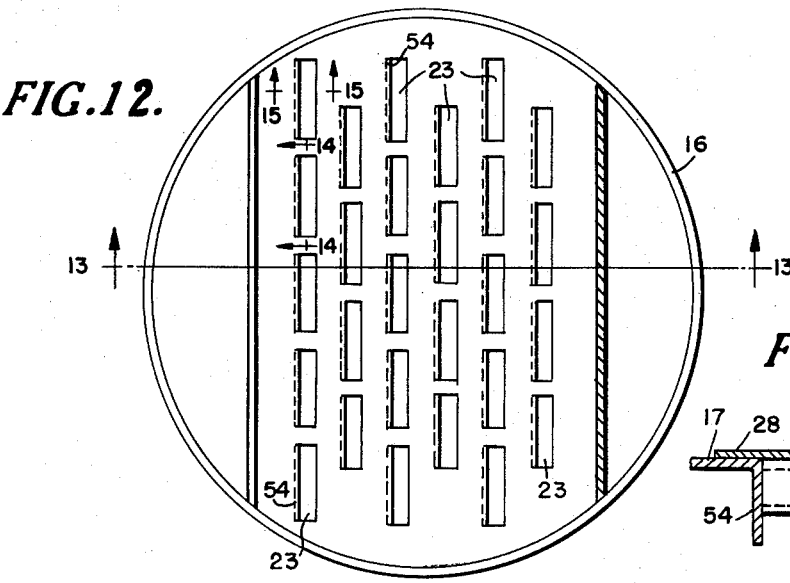
Figure 12 is a plan view of the tray of a refining tower or the like, provided with elongated flow openings arranged in rows with adjacent rows offset or staggered relative to each other and with the floating valves removed.
Figure 15:
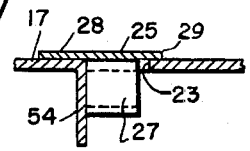
Figure 15 is an enlarged sectional view taken substantially along the line 15—15 of Figure 12, and showing the floating valve associated with a flow opening and in its closed position.
Figure 13:
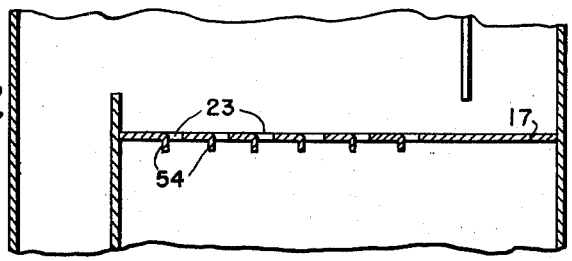
Figure 13 is a sectional view taken substantially along the line 13—13 of Figure 12.
Figure 14:
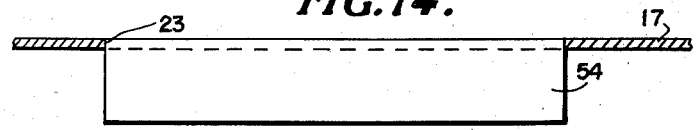
Figure 14 is an enlarged sectional view taken substantially along the line 14—14 of Figure 12.

In the modified form of the invention, shown in Figures 12, 13, 14, and 15, the refining or bubble tower 16 is provided with vertically spaced trays 17, each of which may have elongated flow openings 23 with which are associated the floating pivoted valves 25, as shown in Figure 1. Additionally, each of the flow openings or slots 23 is punched out of tray deck 17 at its opposite ends and along one side, so as to form with the opposite side an integral depending longitudinally disposed flange or lip 54 (Fig. 15). Each of the valves 25 is arranged to overlap and close a flow opening 23 when the valve is in its closed position, so that its heavy edge 28 is on the same side of the slot 23 as the depending flange or leg 54 (Fig. 15). Thus, it will be seen that, upon variation in the differential gas pressure from below the tray 17 to above the same, the valve 25 will initially be rocked or tilted about its heavy edge 28, so as to be raised to an intermediate position and permit initial opening of its opposite light edge 29. The elongated slots 23 are arranged in transverse rows with adjacent rows being longitudinally offset relative to each other (Fig. 12).

The depending flanges or lips 54 which are formed on one side of the flow openings or slots 23 are punched from the slots along the opposite sides and ends so as to extend downwardly therefrom. As these depending flanges 54 are offset with respect to one another in adjacent rows, they serve to provide a truss or beam action for stiffening each of the tray decks 17 in order to make the same self-supporting and thus substantially reduce and, in some cases, dispense with the use of auxiliary or supplemental trussing or reinforcing means for the trays.

Moreover, the depending flanges 54, when crating or packing the parts of the bubble tower for shipment, are so disposed as to extend beyond the extremities of the depending arms 27 of the floating valves, and thus shield them from the possibility of damage or destruction during the packing or shipment of the dismantled parts. By forming the depending flanges or webs 54 from the tray 17, the material is cut along three sides only so that no stock is actually discarded. In forming the slots 23, as shown in Figure 1, the stock removed from these slots must pass through the dies or tools with which they are punched which is quite a precise operation and not infrequently, causes the dies to clog which results in serious breakage and unnecessary waste of material. Thus, by forming the depending legs or webs 54 from a side wall of a flow opening, with no material being discarded and passed through the dies or tools, breakage of the dies and tools is substantially reduced without detracting from the otherwise efficient operation of the refining or bubble tower. Additionally the legs 54 provide protecting means for preventing damage to the depending valve arms 27 when the parts are installed as well as during shipment and handling.

It will be noted that, in all forms of the invention, a floating pivoted valve formed from a single piece of light, durable material is provided; and each valve has depending means in the form of spaced arms or legs which extend through a flow opening and terminate in outwardly and laterally extending stop flanges or lugs which may be formed prior to the insertion of the valve through the flow opening or, after it is moved to its closed position, depending upon whether or not the valve is made of flexible or non-flexible material. Thus, it will be seen that the number of parts of the valve are reduced to a minimum, so that it may readily be installed in a refining tower or the like at a minimum expenditure of time, labor, and cost. Moreover, the floating pivoted valve may be of any suitable shape and associated with flow openings of different configurations. Each of the deck trays may be provided with flow openings punched from the material of the tray, so as to form depending legs that serve to reinforce and strengthen the trays when installed in a refining tower or the like.

It will be understood that the several forms of the invention shown and described are merely illustrative and that such changes may be made as come within the scope of the following claims.

I claim:

1. A gas and liquid contact apparatus of the class described comprising: a tray having a flow opening; said tray having an inlet side for receiving a liquid and directing the same over the top of the tray and an exit disposed at the opposite side thereof; a loosely mounted valve disposed above said tray and adapted for pivotal movement relative thereto, said valve being shaped to overlie said flow opening and engage the top of said tray when in a closed position and having one side edge heavier than its opposite side edge and having spaced depending arms of predetermined length extending through said flow opening, said arms extending almost the entire width of the opening and below said tray to permit pivotal movement of said arms in said openings; a laterally extending flange on the lower end of each of said arms engageable with the underside of said tray to limit the movement of said valve and said arms relative to said tray, said valve being initially pivoted a predetermined distance about its heavier edge into an inclined position upon variation of fluid pressure on opposite sides of the tray whereby the edges of said flanges adjacent said lighter edge of said valve engage the underside of said tray to limit the initial pivotal motion of said valve and said arms, said valve being finally pivoted to a predetermined full open position upon increased fluid pressure differential wherein said valve pivots about the edges of said flanges in engagement with the underside of said tray, thus raising said valve so that said flanges are in full contact with the bottom of said tray to limit the upward movement of said valve.

2. The structure defined in claim 1 in which the heavier side of said valve overlies in greater portion of said tray than the lighter side of said valve.

3. The structure defined in claim 2 in which said tray includes a depending flange disposed on its underside and extending longitudinally adjacent one edge of said flow opening.

References Cited in the file of this patent

UNITED STATES PATENTS

| | | |
|---|---|---|
| 1,057,576 | Mussell | Apr. 1, 1913 |
| 1,453,735 | Twining | May 1, 1923 |
| 2,061,830 | Campbell | Nov. 24, 1936 |
| 2,718,900 | Nutter | Sept. 27, 1955 |
| 2,718,901 | Nutter | Sept. 27, 1955 |
| 2,772,080 | Huggins et al. | Nov. 27, 1956 |

FOREIGN PATENTS

| | | |
|---|---|---|
| 732,154 | Great Britain | June 22, 1955 |

OTHER REFERENCES

"Tray Designs," Chemical Engineering, May 1954, pages 176, 177.